March 4, 1930.   C. P. RANDOLPH ET AL   1,749,718
ELECTRIC SUPPLY SYSTEM
Filed Dec. 13, 1926
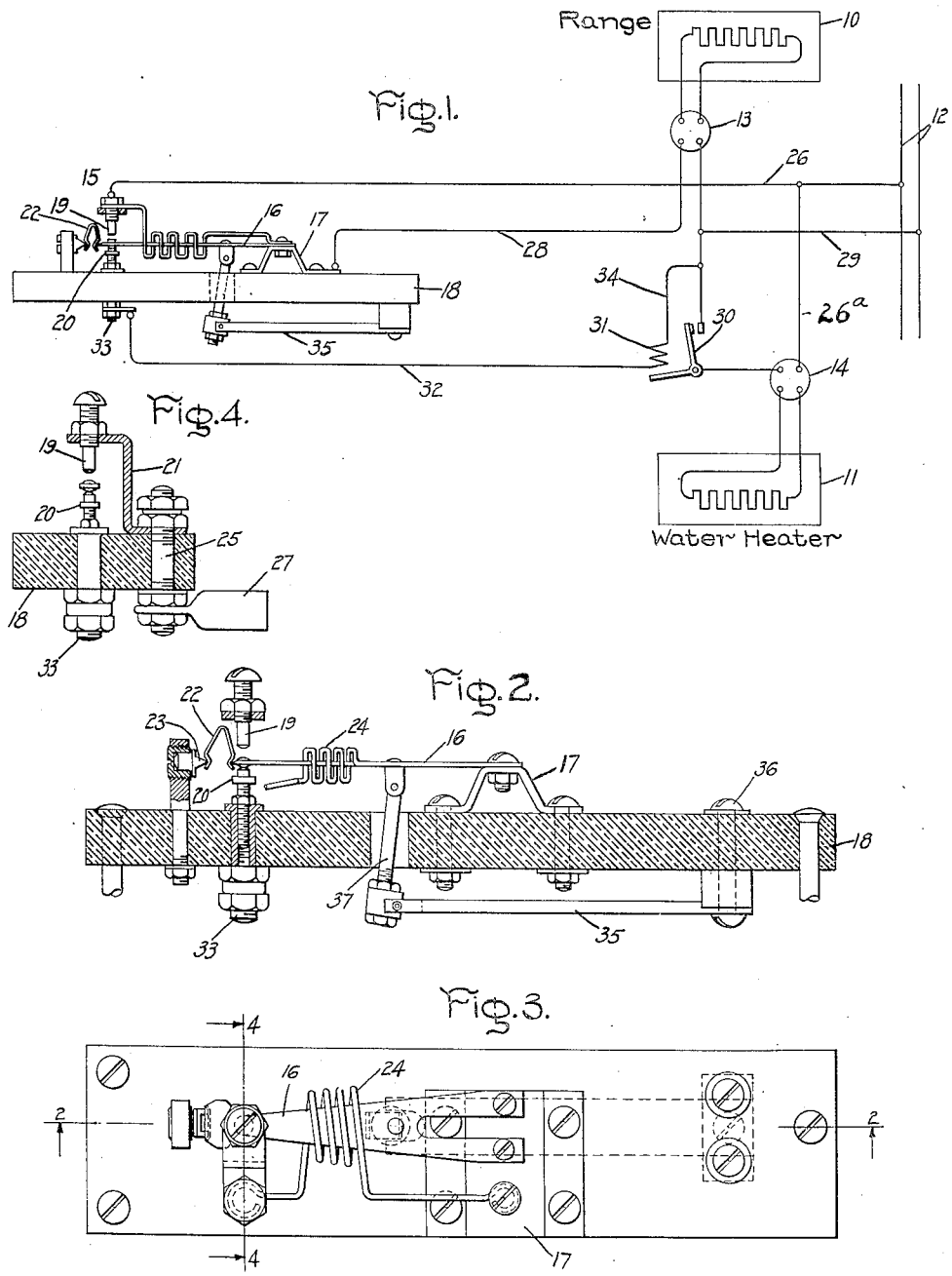
Inventors:
Charles P. Randolph,
Francis H. McCormick,
by 
Their Attorney.

Patented Mar. 4, 1930

1,749,718

UNITED STATES PATENT OFFICE

CHARLES P. RANDOLPH, OF OAK PARK, AND FRANCIS H. McCORMICK, OF GLEN ELLYN, ILLINOIS, ASSIGNORS TO EDISON ELECTRIC APPLIANCE COMPANY, INCORPORATED, OF CHICAGO, ILLINOIS, A CORPORATION OF NEW YORK

ELECTRIC SUPPLY SYSTEM

Application filed December 12, 1926. Serial No. 154,374.

Our invention relates to electric supply systems, more particularly to electric supply systems for devices which are to be operated intermittently, and has for its object the provision of simple and reliable means whereby the operation of the devices is controlled so as to limit the maximum load connected to the supply circuit.

More especially our invention relates to the intermittent operation of a plurality of electrical devices, one or more of which, designated as a "primary" load, is to be given preference over the remaining devices constituting a "secondary" load. While our invention obviously has general application to electrical devices, such as motors, heaters, lights, etc., the operation of an electric range and water heater furnishes a typical illustration. In this combination the range is used but a few hours daily, and this is also true of the water heater. The range, which constitutes the primary load, must be available for use when needed, however, and its operation must not be interrupted. The water heater, which constitutes the secondary load, may, on the other hand, be operated during periods when the range is not being used and hot water heated and stored for future use. If the two devices were operated at the same time, it is obvious that a relatively heavy load would be applied to the supply circuit for a short period of time. This intermittent load is highly undesirable from the standpoint of central station operation since the central station equipment must be of such size as to take care of the total maximum demand load even though it be of very short duration. In order to reduce the maximum demand and thus provide a more desirable load, it is preferable to use the water heater only at such times as the range is not being used.

In carrying out our invention in one form, we provide suitable switching means whereby the primary device may be connected as desired together with temperature responsive means actuated in accordance with the load on the primary device for controlling the connection of the secondary device so that the secondary device can be used only when the primary device is disconnected.

For a more complete understanding of our invention reference should be had to the accompanying drawing in which Fig. 1 is a diagrammatic view of an electric heating system embodying our invention; Fig. 2 is a sectional view of the temperature responsive control device taken along the line 2—2 of Fig. 3 looking in the direction of the arrows; Fig. 3 is a plan view of the temperature responsive control device; while Fig. 4 is a sectional view taken along the line 4—4 of Fig. 3 looking in the direction of the arrows.

Referring to the drawing, we have shown our invention in one form in connection with a heating system for an electric range 10, constituting a primary load, and an electric water heater 11, constituting a secondary load, although it obviously may be used in connection with other electric devices which it is desirable to operate in a similar manner. The range and water heater are energized from a suitable electrical supply circuit 12, the electrical connections being controlled by suitable manually operated switches 13 and 14 respectively. It will be understood that either the range or the water heater or both may be controlled by a temperature responsive cut-out. Ordinarily the water heater is controlled by a temperature responsive device which operates to disconnect it when the water in the tank has been heated to a predetermined temperature and reconnect it when the temperature of the water decreases to a predetermined minimum. The circuit of the water heater is also controlled by a temperature responsive device or thermal relay 15 so that when a predetermined range load is connected to the supply source 12 the water heater will be disconnected.

This temperature responsive control device comprises thermostat, shown as a bimetallic strip 16 having one end secured to a bracket 17 mounted on a suitable insulating support 18. The free end of the strip moves, upon distortion of the strip due to changes in temperature, between two stationary electrical contacts 19 and 20 mounted on the support 18, which preferably is made of insulating material, such as bakelite or slate. As shown, the two stationary contacts are mounted on the ends of adjustable screws so that their position in relation to each other can be changed, the contact 19 being secured to a bracket 21. To provide for a quick snap action of the free end of the strip in moving from one contact to the other, a spring 22 is provided which bears against the end of the strip and against a fixed knife-edge bearing 23 which is secured to the support 18. The arrangement of the spring 22 is such that a lateral component of its force, i. e. the component in a vertical direction, is applied in a direction to hold the end of the strip in engagement with either one of the stationary contacts. As the end of the strip moves away from either contact, however, it approaches a neutral position in which the spring pressure is applied directly against the end of the strip. In this neutral position there is no vertical component of the spring pressure, but as the spring moves past this position in either direction an increasing vertical component is applied tending to move the strip to the opposite contact. It will be observed that as the strip leaves either contact the vertical component of the spring pressure opposing this movement rapidly decreases to the neutral position after which it rapidly increases in the opposite direction and the result is that the strip snaps quickly from one position to another. As shown, the spring 22 is in the form of an inverted U although any suitable form of compression spring could be used. Certain features of this temperature responsive device are described and claimed in Patent No. 1,516,195 to Lewerenz.

Surrounding the strip 16 is a heating coil or resistor 24 which, as shown, may be made of relatively stiff resistance heating wire, such as a nickel-chromium alloy. One end of this coil 24 is connected to the upper contact 19, the connection itself being formed with a clamping bolt 25 which secures the bracket 21 to the support 18, the electric circuit leading from the clamping bolt 25, through the bracket 21 to the upper contact. The opposite end of the heating coil is connected to the bracket 17 to which one end of the strip is secured and is, therefore, electrically connected to one end of the thermostat. The internal dimensions of the heating coil 24 are such that the strip is free to move up and down into engagement with one or the other of the contacts 19 and 20 without touching the heating coil. As shown in Fig. 1 this heating coil 24 is in the range circuit, a conductor 26 leading from one side of the supply source 12 to a connection lug 27 which is electrically secured to the bolt 25, and a conductor 28 leading from the bracket 17 to the switch 13. The opposite side of the supply source 12 is connected through a conductor 29 to the switch 13. The temperature responsive device is so arranged that when a predetermined range load is connected, which load may be the entire range load although it is contemplated that it may be only a portion thereof, the heating coil 24 heats the thermostat sufficiently to cause it to snap upward into engagement with the contact 19. When the range load is disconnected or below a predetermined amount, the thermostat cools and seeks a normal position in engagement with the lower contact 20, as shown in the drawing. The normal position is determined by forming the bimetallic strip so as to have spring tension against the lower contact. The operation of the thermostat controls the connection of the water heater by means of a switch 30 which is operated by a magnet coil 31. One terminal of the magnet coil is electrically connected through a conductor 32 to the lower contact 20, this connection being made with a stud 33 which carries the lower contact. The opposite terminal of the magnet coil is connected by a conductor 34 to the conductor 29 which leads to the supply source. As shown, the switch 30 opens and closes a connection between the conductor 29 and the manually operated switch 14. A conductor 26ª leads from the switch 14 to the opposite side of the supply source. It will thus be observed that when the range is disconnected and the temperature control device is in normal position, as shown in the drawing, the magnet coil 31 is connected to the supply source 12 so that the switch 30 is held in closed position by the coil, the circuit for the coil being from the supply source through conductor 29, conductor 34, the coil, conductor 32 to the movable end of the thermostat through the thermostat and thence through the heating coil 24 and conductor 26 back to the opposite side of the source. Under these conditions the water heater may be connected at will by means of the switch 14. When the thermostat moves upward upon the application of a predetermined range load, the circuit of the magnet coil 31 is opened by the disengagement of the thermostat with the lower contact 20. This allows the switch 30 to open to disconnect the water heater, if connected, and prevent its being connected by means of the switch 14 as long as the predetermined range load is connected. Upon a decrease in the range load to a predetermined amount, the heating coil generates insufficient heat to maintain the thermostat in its upper position, and the thermostat thereupon cools and moves downward to reengage the contact 20. This closes the switch 30 whereby the water heater is again connected to the supply circuit, provided switch 14 is in closed position.

It will be observed that when the thermostate moves into engagement with the contact 19 it closes a circuit through itself which is in shunt with the heating coil 24. The thermostat being of much lower resistance than the heating coil thereafter takes the greater part of the range current and this prevents overheating of the coil 24. This is an important feature as will be evident from the fact that the thermostat may be set to operate when a range load of 5 amperes is applied, whereas the total range load which may be connected at times may be as high as 35 or more amperes. As the heating coil 24 cools, due to shunting of its current by the thermostat, the thermostat will tend to move downward and leave the upper contact, but when this occurs it will be observed that the heating coil is immediately connected into the range circuit and again heats the thermostat to cause it to return to the upper contact. Preferably the upper contact 19 will be adjusted much further away from the neutral position than the lower contact so that the thermostat can move away from it slightly without snapping completely over to the lower contact 20. As long as the predetermined amount of range load is connected, therefore, the thermostat operates in conjunction with the upper contact to alternately connect and disconnect the heating coil but without engaging the lower contact.

In order to compensate for variations in the ambient temperature, an auxiliary bimetallic thermostatic bar 35 is provided. This bar has one end secured to the support 18 by means of a bolt 36 and its other end is connected to the thermostat 16 by means of an adjustable link 37. These two thermostats are arranged to operate in opposition to each other. An increase in temperature which tends to cause the thermostat 16 to move upward has an opposite effect on the thermostat 35 tending to cause it to move downward and this downward tendency of the thermostat 35 exactly neutralizes the tendency of the thermostat 16 to move upward. Conversely a decrease in the ambient temperature causing the thermostate 16 to be distorted downward is offset by an opposing tendency in the thermostat 35. This compensating action of the thermostat 35 is such that the thermostat 16 always operates upon the occurrence of a predetermined temperature rise caused by the heating coil 24 irrespective of the temperature of the surrounding air and as a result the thermostat always disconnects the water heater upon the occurrence of a predetermined range load.

While we have described our invention as embodied in concrete form and as operating in a specific manner in accordance with the provisions of the patent statutes, it should be understood that we do not limit our invention thereto since various modifications thereof will suggest themselves to those skilled in the art without departing from the spirit of our invention the scope of which is set forth in the annexed claims.

What we claim as new and desire to secure by Letters Patent of the United States, is:

1. A system of control for a plurality of electrical devices constituting primary and secondary loads, comprising a thermostatic control device responsive to the amount of said primary load, and connections whereby said thermostatic control device reduces said secondary load when said primary load exceeds a predetermined amount and reconnects said secondary load when said primary load is less than a predetermined amount.

2. A system of control for two electrical devices adapted for intermittent operation, one of said devices constituting a primary load and the other device constituting a secondary load, comprising a temperature responsive means in circuit with said primary load for reducing said secondary load when said primary load exceeds a predetermined amount and for reconnecting said secondary load when said primary load is less than a predetermined amount.

3. A system of control for two electrical devices, comprising a thermal relay responsive to the connected load of one of said devices, and connections whereby said relay disconnects the other device when said load exceeds a predetermined value and reconnects said latter device when said load is less than a predetermined value.

4. A system of control for two electrical devices, comprising a thermostat, heating means for said thermostat responsive to the current supplied to one of said devices, and control means for the other device operated by said thermostat.

5. A system of control for two electrical devices constituting primary and secondary loads, comprising a thermostat, heating means for said thermostat connected in circuit with said primary load, control means for the circuit of said secondary load operated by said thermostat, and connections whereby said thermostat short circuits said heating means when said primary load exceeds a predetermined amount.

6. A system of control for two electrical devices constituting primary and secondary loads, comprising a heating resistor responsive to said primary load, and a thermostatic control device responsive to said heating resistor for disconnecting said secondary load and for short circuiting said heating resistor when said primary load exceeds a predetermined amount.

7. A system of control for two electrical devices constituting primary and secondary loads, comprising a cut-out switch in the circuit of said secondary load, a thermostat for controlling said cut-out, heating means for said thermostat responsive to the current supplied to said primary load whereby said cut-out is opened to disconnect said secondary load when said primary load exceeds a predetermined value and to reconnect said secondary load when said primary load is less than a predetermined amount, and means for compensating said thermostat for changes in the ambient temperature.

8. A system of control for two electrical devices constituting primary and secondary loads, comprising a cut-out switch in the circuit of said secondary load, a thermostat for controlling said cut-out, heating means for said thermostat responsive to the current supplied to said primary load whereby said cut-out is opened to disconnect said secondary load upon the occurrence of a predetermined primary load, and a second thermostat connected to the first so as to compensate for changes in the ambient temperature.

9. A system of control for two electrical devices constituting primary and secondary loads, comprising a bimetallic, thermostatic strip having a portion moving between two positions in response to changes in temperature, electric heating means for said strip responsive to said primary load, resilient means cooperating with the movable portion of said strip so as to cause said strip to snap quickly from one position to another, and control means for said secondary load operated by said thermostat to disconnect said secondary load when said primary load exceeds a predetermined amount and for reconnecting said secondary load when said primary load is less than a predetermined amount.

10. A system of control for two electrical devices constituting primary and secondary loads, comprising a bimetallic thermostatic strip having a portion moving between two positions in response to changes in temperature, electric heating means for said strip connected in circuit with said primary load, resilient means cooperating with the movable portion of said strip so as to cause said strip to snap quickly from one position to another, control means for said secondary load operated by said thermostat to disconnect said secondary load when said primary load exceeds a predetermined amount, and connections whereby said strip short circuits said heating means when it moves to a position to disconnect said secondary load.

11. The combination with an electric range and water heater, of a temperature responsive device, heating means associated with said device connected in the circuit of said range, and a cut-out for said water heater operated by said temperature responsive device to disconnect said water heater when said range is in operation.

12. The combination with an electric range and water heater, of a bimetallic bar thermostat, a heating coil surrounding said bar connected in the circuit of said range, a cut-out for said water heater, and connections whereby said thermostat operates said cut-out to disconnect said water heater when a predetermined range load is connected.

13. In an electric heating system, the combination with a range, of a water heater, and thermostatic means responsive to variations in the flow of current in said range for automatically controlling the water heater circuit.

14. In an electric heating system, the combination with a range, of a water heater, and a thermostatic switch responsive to a heating element in the range circuit for automatically controlling the water heater circuit.

15. In an electric heating system the combination with a plurality of heating units of a thermostatic switch adapted for automatically opening the circuit of one of said heating units when the other of said units is energized.

16. In an electric heating system the combination with a plurality of heating units, of a thermostatic control member adapted for automatically opening a switch in the circuit of one of said heating units when the other of said units is energized.

In witness whereof, we have hereunto set our hands this third day of December, 1926.

CHARLES P. RANDOLPH.
FRANCIS H. McCORMICK.